US007046390B2

(12) United States Patent
Atkins

(10) Patent No.: US 7,046,390 B2
(45) Date of Patent: May 16, 2006

(54) SYSTEM AND METHOD FOR SCALING AND ENHANCING COLOR TEXT IMAGES

(75) Inventor: Clayton Brian Atkins, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1044 days.

(21) Appl. No.: 09/777,349

(22) Filed: Feb. 5, 2001

(65) Prior Publication Data

US 2002/0149578 A1    Oct. 17, 2002

(51) Int. Cl.
*H04N 1/40* (2006.01)

(52) U.S. Cl. .................. 358/1.2; 358/3.12; 382/237
(58) Field of Classification Search .............. 345/22; 395/128, 125, 131; 382/162, 167, 214, 164, 382/254, 237; 358/1.2, 1.9, 2.1, 3.12, 528, 358/451
See application file for complete search history.

(56) References Cited

U.S. PATENT DOCUMENTS

| 5,146,346 A | | 9/1992 | Knoll |
|---|---|---|---|
| 5,506,946 A | * | 4/1996 | Bar et al. .................. 345/600 |
| 5,650,858 A | * | 7/1997 | Lund ........................ 358/3.15 |
| 5,930,385 A | * | 7/1999 | Fujimoto et al. ............ 382/162 |
| 6,172,766 B1 | | 1/2001 | Honma |
| 6,226,397 B1 | * | 5/2001 | Yamagata et al. .......... 382/162 |

OTHER PUBLICATIONS

Jan Allebach and Ping Wah Wong, "Edge-Directed Interpolation", IEEE, 0-7803-3258-X/96, 1996, pp. 707-710.

S. Grace Chang, Zoran Cvetkovic, and Martin Vetterli, "Resolution Enhancement of Images Using Wavelet Transform Extrema Extrapolation", IEEE, 0-7803-2431-5/95, 1995, pp. 2379-2382.

Kris Jensen and Dimitris Anastassiou, "Subpixel Edge Localization and the Interpolation of Still Images", IEEE Transactions on Image Processing, vol. 4, No. 3, Mar. 1995, pp. 285-295.

Michael Unser, Akram Aldroubi, and Murray Eden, "Enlargement or Reduction of Digital Images with Minimum Loss of Information", IEEE Transactions on Image Processing, vol. 4, No. 3, Mar. 1995, pp. 247-258.

(Continued)

*Primary Examiner*—Thomas D. Lee
*Assistant Examiner*—Stephen Brinich

(57) ABSTRACT

A system and method for scaling and enhancing color text images utilizes a binary scaling and text enhancing technique by first converting an input color text image to a binary image, i.e., black-and-white image. The scaled and text enhanced image is subsequently converted back to a color image by selectively inserting colors into the binary image to produce a color text image that has been scaled and text enhanced. The conversion of the input color text image to a binary image allows the system and method to use one of a number of conventional binary scaling and text enhancing techniques.

21 Claims, 17 Drawing Sheets

OTHER PUBLICATIONS

Michael Unser, Akram Aldroubi, and Murray Eden, "Fast B-Spline Transforms for Continuous Image Representation and Interpolation", IEEE Transactions on Pattern Analysis and Machine Intelligence, vol. 13, No. 3, Mar. 1991, pp. 277-285.

Robert G. Keys, "Cubic Convolution Interpolation for Digital Image Processing", IEEE Transactions on Acoustics, Speech, and Signal Processing, vol. ASSP-29, No. 6, Dec. 1981, pp. 1153-1160.

Hsieh S. Hou and Harry C. Andrews, "Cubic Splines for Image Interpolation and Digital Filtering", IEEE Transactions on Acoustics, Speech, and Signal Processing, vol. ASSP-26, No. 6, Dec. 1978, pp. 508-517.

* cited by examiner

T37

T38

T39

T40

T41

T42

T43

T44  T45  T46

T47  T48  T49

T50  T51  T52

T53  T54

T69  T70  T71

T72  T73  T74

T75  T76  T77

SYSTEM AND METHOD FOR SCALING AND ENHANCING COLOR TEXT IMAGES

FIELD OF THE INVENTION

The invention relates generally to the field of image processing, and more particularly to a system and method for scaling color text images.

BACKGROUND OF THE INVENTION

Text quality of printed documents is one of the most important factors in the evaluation of home or office printers. Consumers typically have a high expectation with respect to the quality of printed text. In general, consumers expect the text of printed documents to have smooth and sharp edges. In addition to the text quality, consumers expect the documents to be printed at a high rate of speed.

In contemporary digital printing systems, text are often rendered at one resolution but must be printed at a higher resolution. This process is commonly referred to as "text scaling". One simple approach to text scaling is to replicate each pixel of an input document image to print the document image at a higher resolution. For example, if the input document image is to be printed at twice the original resolution, each pixel of the image is replicated to produce four pixels in a 2×2 pixel configuration. Consequently, the text is printed at twice the resolution of the original image. A concern with the pixel replication approach is that the scaled document image may have text edges that are not smooth as the original document image. Thus, the quality of the text may be significantly degraded as a result of the pixel replication.

There are a number of conventional text scaling techniques that can also enhance the text by smoothing the text edges of the scaled image. However, these conventional techniques are only designed for document images having black text on white background. Until recently, color printers were not affordable by the majority of consumers. Thus, the number of printers that can only print in black significantly outnumbered color printers. Consequently, improvements in the printing technology were primarily directed to document images having black text on white background. As a result, these conventional text scaling techniques are not suitable for enhancing document images having color text on color background.

However, there are general image scaling techniques that can scale color images, such as document images having color text on color background. Unlike the previously described text scaling techniques, these general image scaling techniques are designed for images with pictorial content, not for images with text. A large subset of the general image scaling techniques utilizes image interpolation, such as bilinear interpolation, cubic B-spline interpolation, and cubic convolution interpolation, to correct spatial distortion when images are scaled. Another subset of the general image scaling techniques utilizes edge detection to sharpen the detected edges of features contained in a given image.

A concern with the former subset of the general image scaling techniques is that these techniques are based on the assumption that the underlying image signal is continuous. That is, if two image intensities or colors are close in spatial proximity, then the intensities or the colors themselves are assumed to be close to each other. However, text images do not conform to this assumption, because the transitions between text and background are sharp, not continuous. Thus, these image interpolation techniques are not suitable for text images. In contrast, the latter subset of the general image scaling techniques are more suited for text images since they are based on preserving discontinuous edges. However, these edge-based scaling techniques are computationally intensive.

In addition to the above concerns, the general image scaling techniques produce output images that may contain colors that were not present in the input image. Thus, these techniques are not suited for implementation after halftoning and/or color matching stage of the printing process.

In view of these concerns, there is a need for a system and method for efficiently scaling and text enhancing document images having color text on color background using only the colors of the original document images.

SUMMARY OF THE INVENTION

A system and method for scaling and enhancing color text images utilizes a binary scaling and text enhancing technique by first converting an input color text image to a binary image, i.e., black-and-white image. The scaled and text enhanced image is subsequently converted back to a color image by selectively inserting colors into the binary image to produce a color text image that has been scaled and text enhanced. The conversion of the input color text image to a binary image allows the system and method to use one of a number of conventional binary scaling and text enhancing techniques.

A method in accordance to the present invention includes the step of converting an input digital image having color features to a binary image of first and second type pixels such that pixels of the input digital image that define the color features are substantially converted to first type pixels of the binary image. In one embodiment, the input digital image is converted to the binary image by comparing color components of the input digital image with predefined thresholds to classify pixels of the input digital image as either the first type pixels or the second type pixels of the binary image. In another embodiment, the input digital image is converted to the binary image by dividing the pixels of the input digital image into first and second groups based on color differences of the pixels of the input digital image. The pixels of the input digital image that belong to a smaller group can then be converted to the first type pixels of the binary image, while the pixels that belong to the larger group can be converted to the second type pixels of the binary image.

The method further includes the steps of changing the resolution of the binary image to derive a modified binary image and selectively inserting colors into pixels of the modified binary image to produce an output digital image having modified color features that differ in resolution with the color features of the input digital image. In one embodiment, the step of selectively inserting colors includes inserting only colors from the input digital image into the pixels of the modified binary image. In another embodiment, the step of selectively inserting colors includes the steps of comparing a particular pixel of the modified binary image with a corresponding pixel of the binary image, determining whether the particular pixel of the modified binary image substantially matches the corresponding pixel of the binary image, and inserting the color of a pixel of the input digital image from which the corresponding pixel of the binary image was derived into the particular pixel. In still another embodiment, the step of selectively inserting colors includes comparing the particular pixel of the modified binary image with neighboring pixels of the corresponding pixel of the binary image in a predefined sequence, if the particular pixel and the corresponding pixel do not substantially match, and inserting the color of a pixel of the input digital image that corresponds to a specific pixel selected from the neighboring pixels of the binary image that substantially matches the particular pixel of the modified binary image into the particular pixel, where the specific pixel is the first pixel of the neighboring pixels in the predefined sequence that substantially matches the particular pixel of the modified binary image.

A system in accordance to the present invention includes a color-to-binary converter that converts an input digital image having color features to a binary image of first and second type pixels such that pixels of the input digital image that define the color features are substantially converted to first type pixels of the binary image. In one embodiment, the color-to-binary converter is configured to compare color components of the input digital image with predefined thresholds to classify pixels of the input digital image as either the first type pixels or the second type pixels of the binary image. In another embodiment, the color-to-binary converter is configured to divide the pixels of the input digital image into first and second groups based on color differences of the pixels of the input digital image. The pixels of the input digital image that belong to a smaller group can then be converted by the color-to-binary converter to the first type pixels of the binary image, while the pixels that belong to the larger group can be converted by the color-to-binary converter to the second type pixels of the binary image.

The system further includes a text enhancing scaler that changes the resolution of the binary image to derive a modified binary image and a color inserter that selectively inserts colors into pixels of the modified binary image to produce an output digital image having modified color features that differ in resolution with the color features of the input digital image. In one embodiment, the color inserter is configured to execute the steps of comparing a particular pixel of the modified binary image with a corresponding pixel of the binary image, determining whether the particular pixel of the modified binary image substantially matches the corresponding pixel of the binary image, and inserting the color of a pixel of the input digital image from which the corresponding pixel of the binary image was derived into the particular pixel. In another embodiment, the color inserter is configured to execute the steps of comparing the particular pixel of the modified binary image with neighboring pixels of the corresponding pixel of the binary image in a predefined sequence, if the particular pixel and the corresponding pixel do not substantially match, and inserting the color of a pixel of the input digital image that corresponds to a specific pixel selected from the neighboring pixels of the binary image that substantially matches the particular pixel of the modified binary image into the particular pixel, where the specific pixel is the first pixel of the neighboring pixels in the predefined sequence that substantially matches the particular pixel of the modified binary image.

Other aspects and advantages of the present invention will become apparent from the following detailed description, taken in conjunction with the accompanying drawings, illustrated by way of example of the principles of the invention.

DETAILED DESCRIPTION

Figure 1:
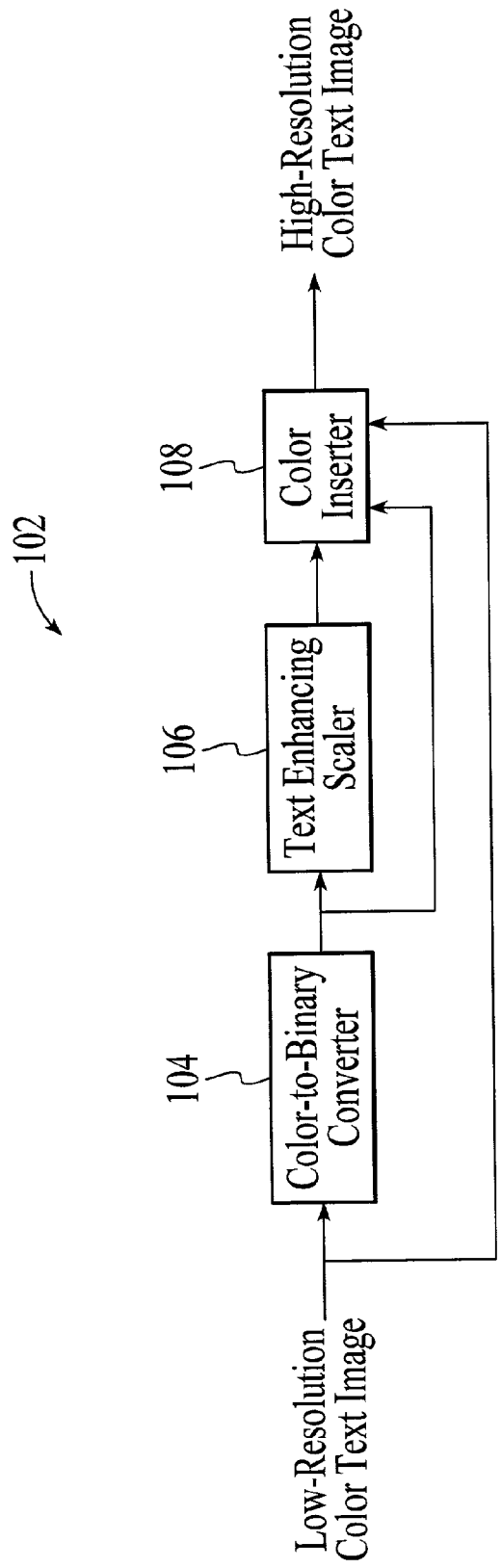
FIG. 1 is a block diagram of a color text enhancing system in accordance with the present invention.

With reference to FIG. 1, a color text enhancing system 102 in accordance with the present invention is shown. The color text enhancing system operates to scale and text enhance input document images having color text on color backgrounds in a computationally efficient manner. In addition, the color text enhancing system uses only the colors of the original input document images for the output document image, which allows the system to be implemented in a color printer after color matching has been performed without the need to perform an additional color matching.

The color text enhancing system 102 includes a color-to-binary converter 104, a text enhancing scaler 106, and a color inserter 108. These components of the color text enhancing system may be implemented in any combination of hardware, firmware and software. The color-to-binary converter 104 operates to convert an input low-resolution color text image to a binary, or black-and-white, image. Specifically, the color-to-binary converter is designed to convert color text pixels of the input image to black pixels, and to convert color background pixels of the input image to white pixels. The input color text image is described herein as being in a CMYK format, with values of C, M, Y and K falling in the range of [0, 1]. However, the input color text image may be in a different color format such as RGB or Lab.

In one embodiment, the color-to-binary converter 104 performs the conversion by assuming that the color text pixels of the input image are "darker" than the color background pixels. The term "darker" refers to higher ink or toner levels of the individual pixels of the input image. However, other definitions of "darker" can be used to distinguish the color text pixels from the color background pixels. Using the above assumption, pixels of the input color text image are determined to be text pixels by the color-to-binary converter if any of the following criteria is satisfied: $C>T_c$, $M>T_m$, $Y>T_y$, and $K>T_k$, where $T_c$, $T_m$, $T_y$ and $T_k$ are predefined thresholds. If a pixel of the input text image is determined to be a text pixel, the pixel is converted to a binary representation of a text pixel, which is a black pixel in this embodiment. Conversely, if a pixel of the input text image is determined to be a background pixel, the pixel is converted to a binary representation of a background pixel, which is a white pixel in this embodiment.

In an alternative embodiment, the color-to-binary converter 104 performs the conversion by assuming that the text pixels and the background pixels of the input text image are of different colors, and that there are fewer text pixels than background pixels in the image. Using these assumptions, the pixels of the input text image are divided into two groups based on color. The smaller of the two groups is determined to be a group of text pixels, while the larger group is determined to a group of background pixels.

Figure 2:
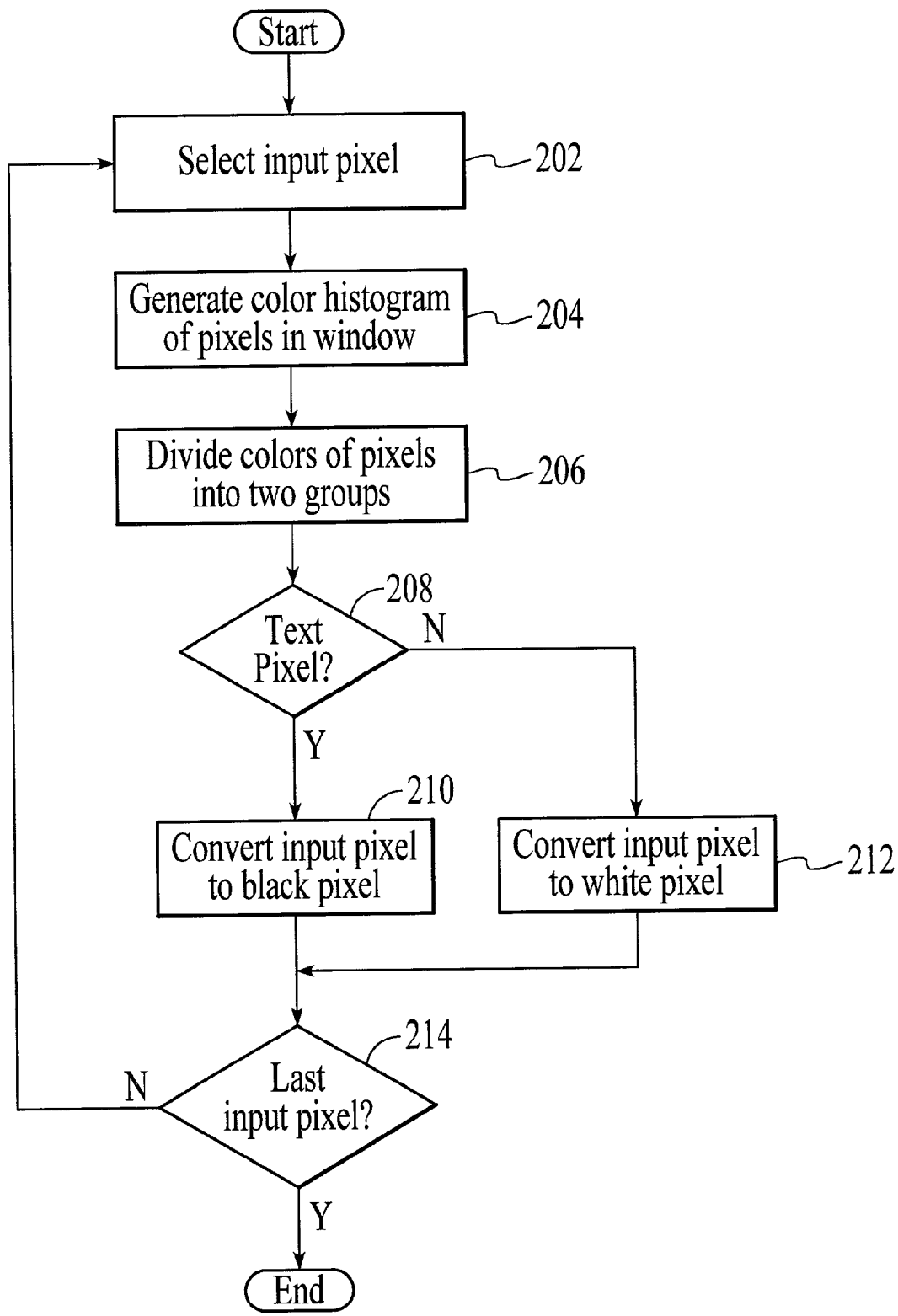
FIG. 2 is a process flow diagram that illustrates the operation of a color-to-binary converter of the color text enhancing system.

The operation of the color-to-binary converter 104 in accordance with the alternative embodiment is described with reference to FIG. 2. At step 202, an input pixel of a given color text image, or a portion of the given text image, is selected to convert the input pixel to a binary pixel, e.g., a black pixel or a white pixel. At step 204, a color histogram of pixels in a window centered about the input pixel is generated. As an example, the window may be an 11×11 pixel window. The color space in which the color histogram is generated may be CMYK, gamma-corrected RGB, or CIELab. If CIELab color space is not used, the pixels may be converted into the CIELab color space, prior to step 204.

Next, at step 206, the pixel colors of the histogram are divided into two groups in order to separate the text pixels and the background pixels of the color text image. The manner in which the colors of the histogram are divided is not critical to the invention. As an example, the pixel colors may be divided by a plane in the color space that defines the two groups. The pixel colors that are on one side of the plane are classified as the first group, while the pixel colors that are on the other side of the plane are classified as the second group. As another example, the pixel colors may be divided by a sphere in the color space. In this example, the pixel colors that are located inside the sphere are classified as one group, while the pixel colors that are located outside the sphere are classified as another group. At step 208, a determination is made whether the input pixel is a text pixel or a background pixel. If the color of the input pixel belongs in a smaller group, the input pixel is determined to be a text pixel. Otherwise, the input pixel is determined to a background pixel. If the input pixel is a text pixel, the process proceeds to step 210, where the input pixel is converted to a black pixel. However, if the input pixel is not a text pixel, the process proceeds to step 212, where the input pixel is converted to a white pixel. Next, at step 214, a determination is made whether the current input pixel is the last pixel to be processed. If so, the process comes to an end. However, if the current input pixel is not the last pixel, the process proceeds back to step 202.

The text enhancing scaler 106 of the color text enhancing system 102 operates to scale and text enhance the output binary image from the color-to-binary converter 104. The text enhancing scaler may perform one of various conventional methods for scaling and enhancing digital document images having black text on white background. As an example, the text enhancing scaler may use a scaling and text enhancing method disclosed in U.S. Pat. No. 5,650,858 to Lund, which is explicitly incorporated herein by reference.

Figure 3:
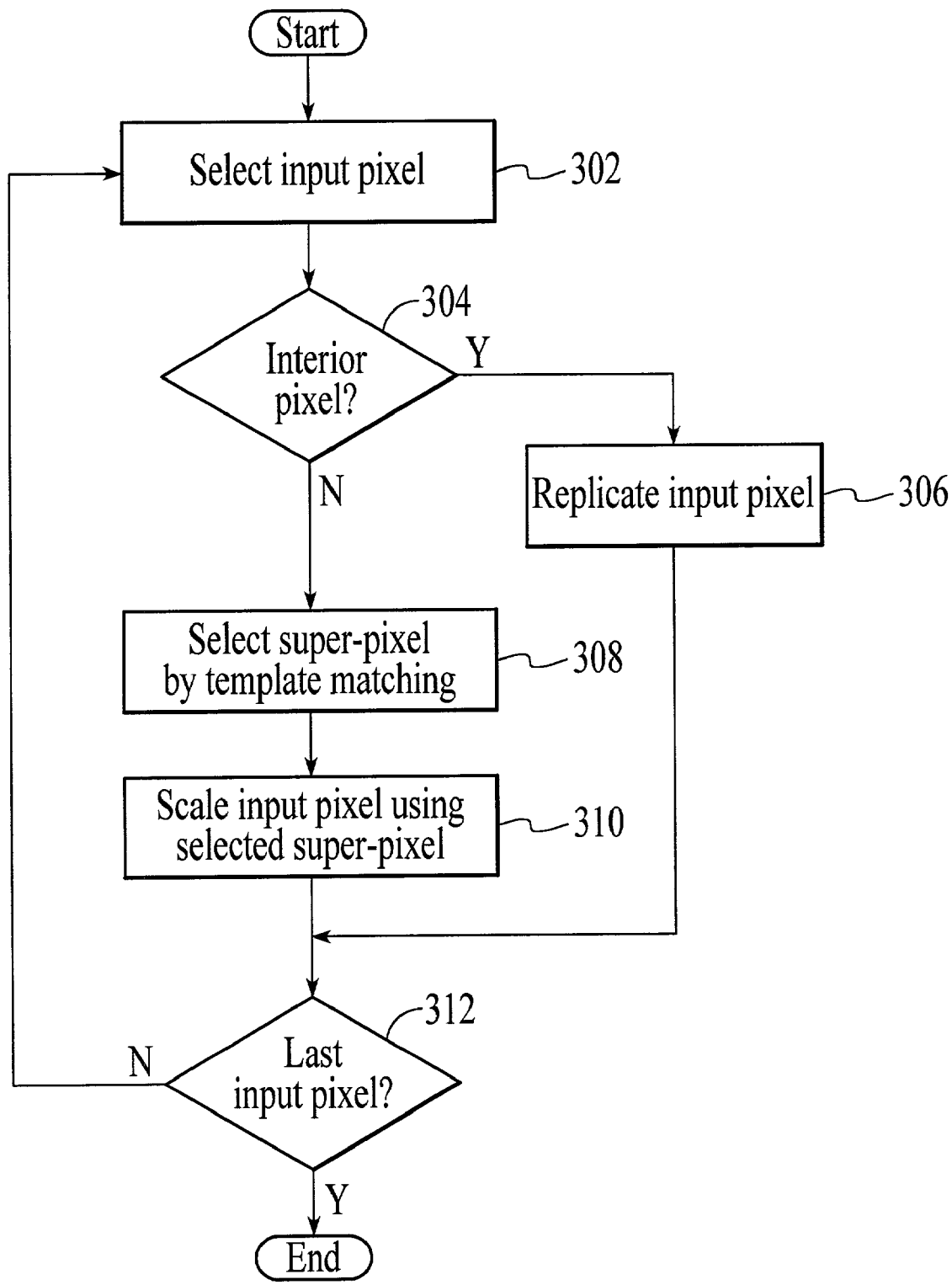
FIG. 3 is a process flow diagram that illustrates the operation of a text enhancing scaler of the color text enhancing system.
Figure 4:
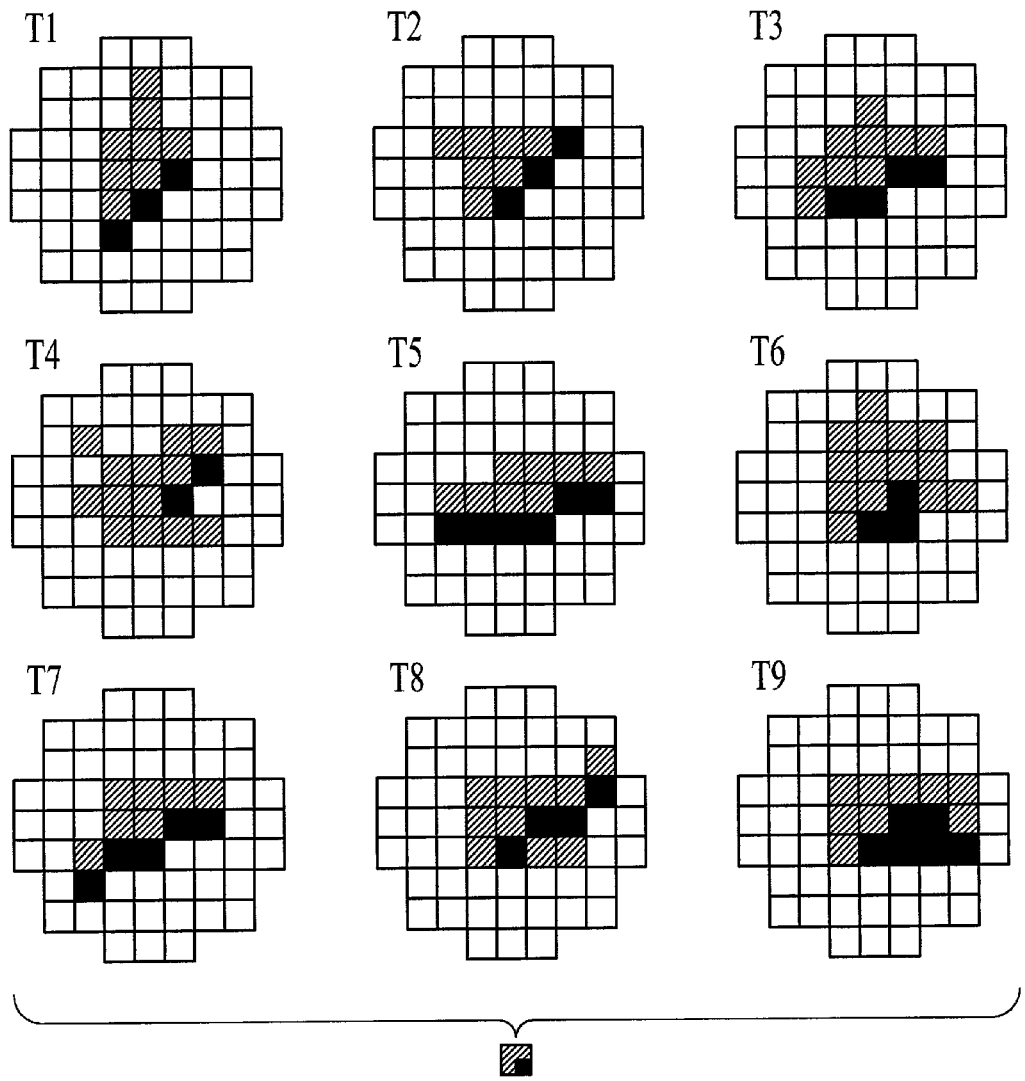
FIGS. 4 through 14 illustrate input templates and output super-pixels that are used by the text enhancing scaler.
Figure 5:
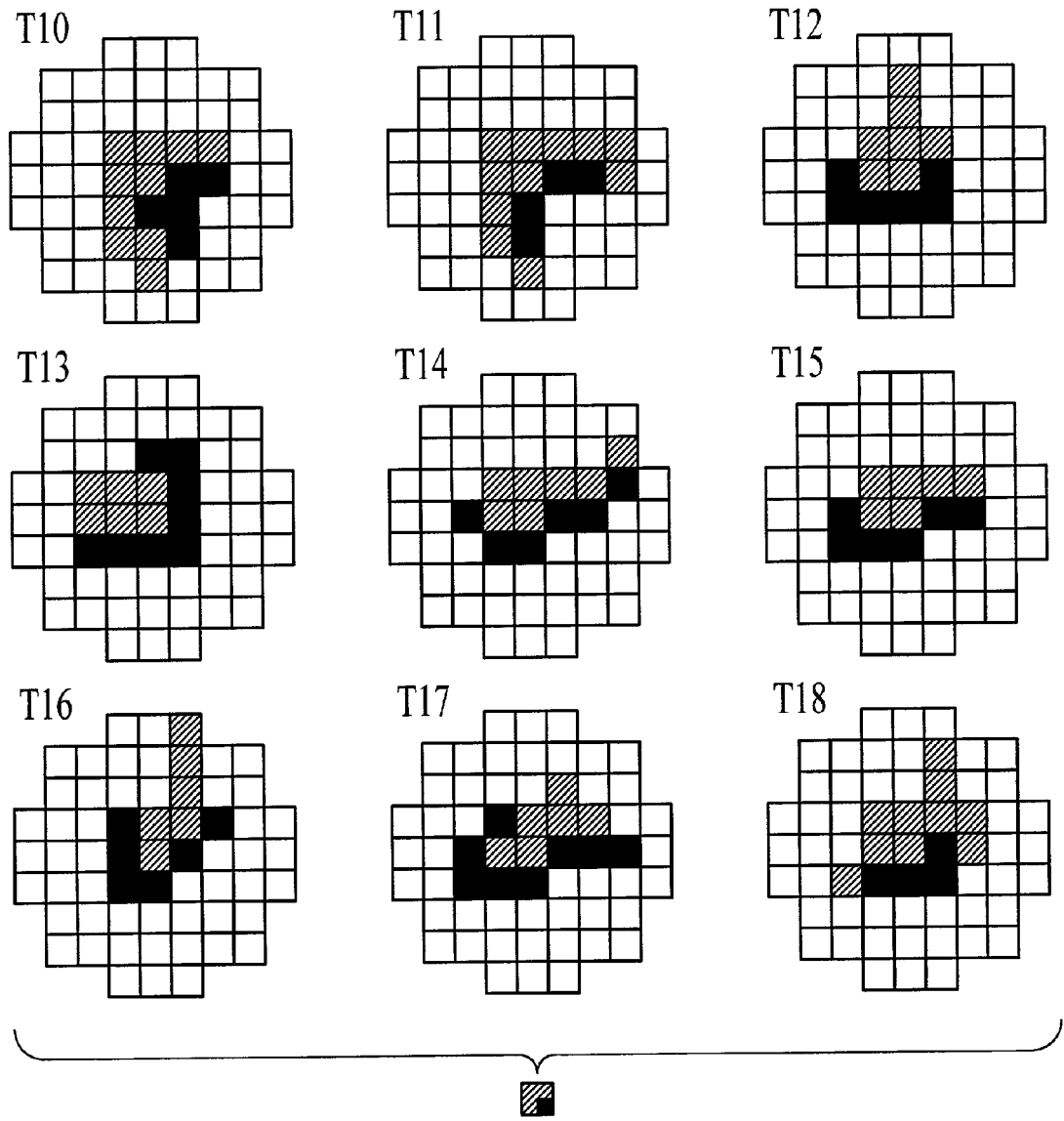
Figure 6:
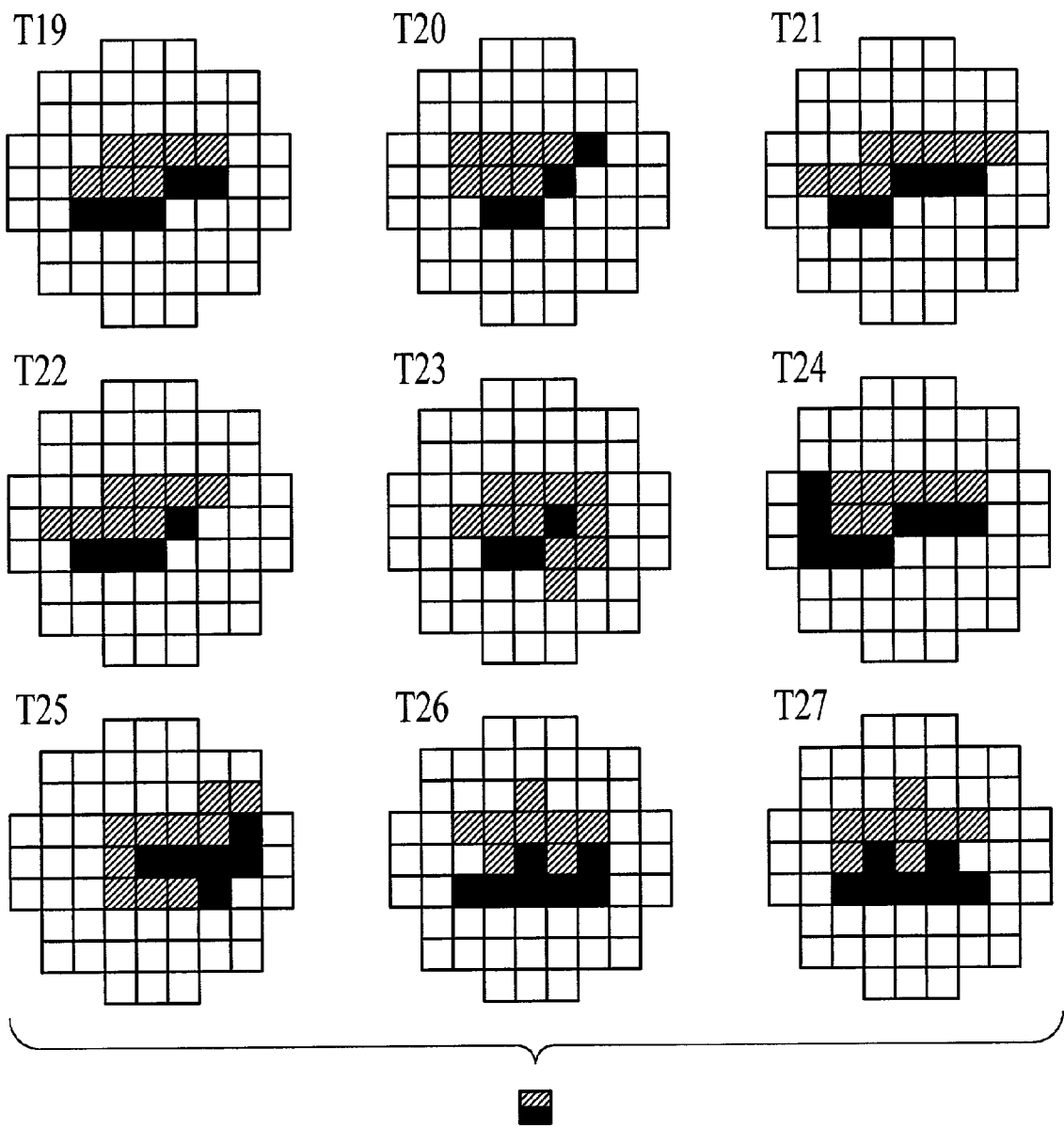
Figure 7:
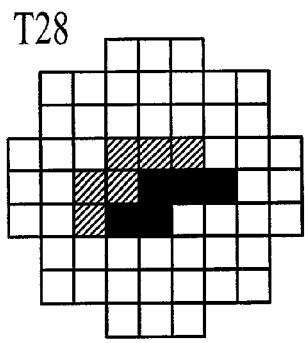
Figure 7:
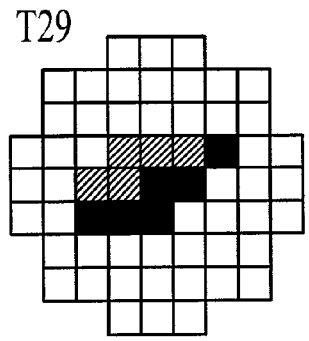
Figure 7:
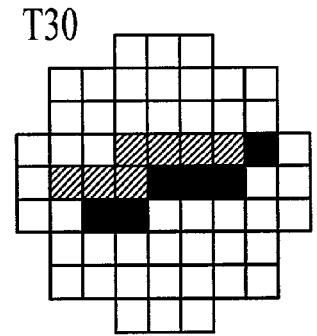
Figure 7:
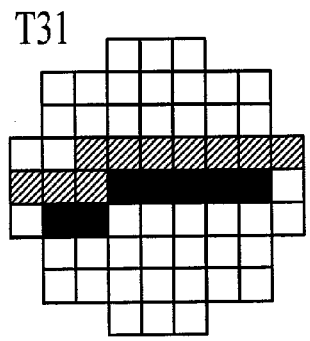
Figure 7:
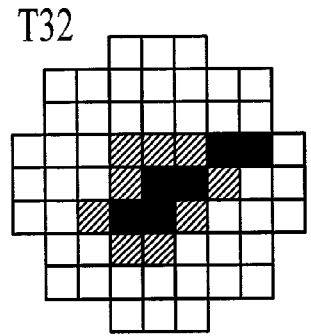
Figure 7:
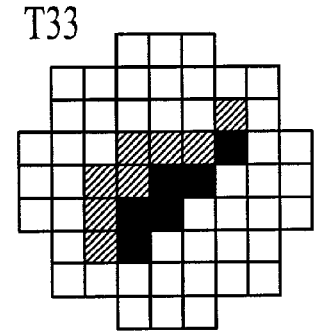
Figure 7:
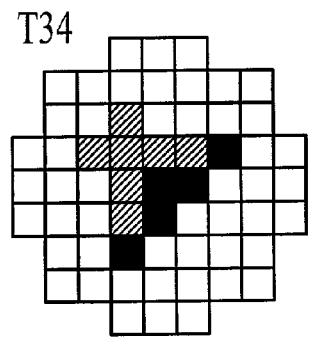
Figure 7:
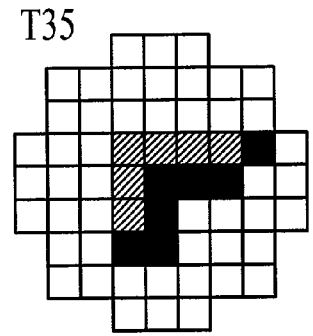
Figure 7:
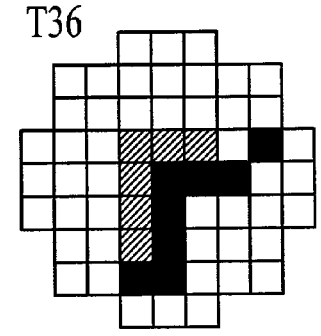
Figure 7:
Figure 8:
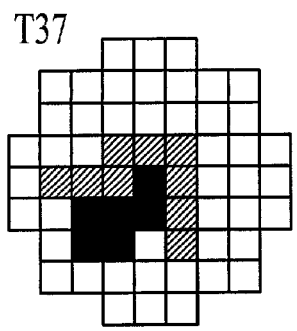
Figure 8:
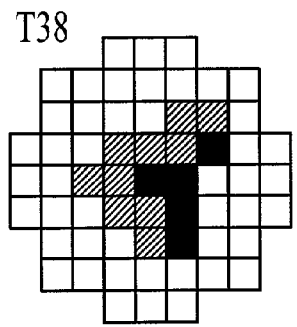
Figure 8:
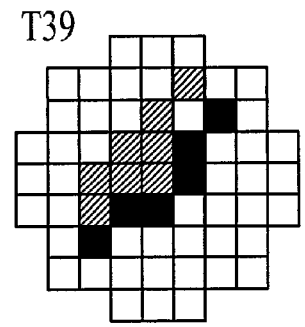
Figure 8:
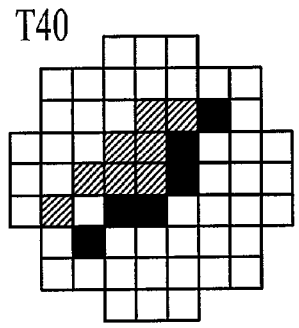
Figure 8:
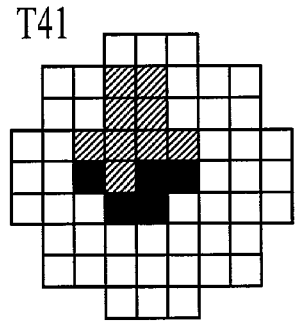
Figure 8:
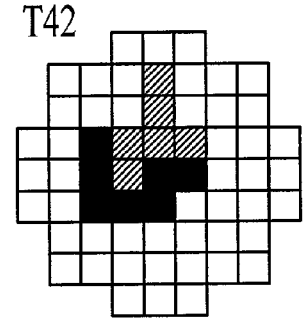
Figure 8:
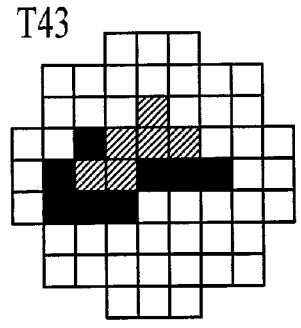
Figure 8:
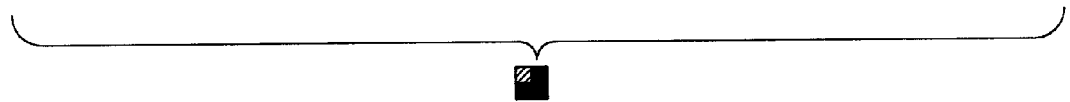
Figure 9:
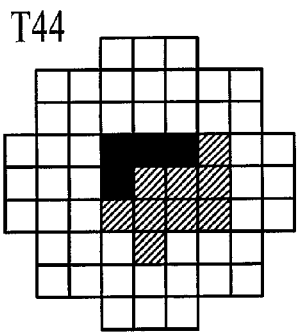
Figure 9:
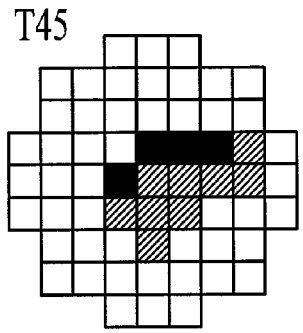
Figure 9:
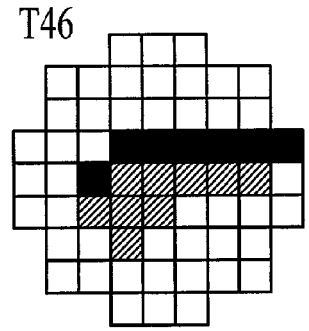
Figure 9:
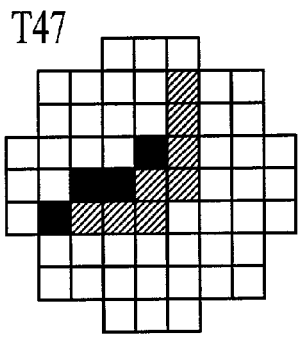
Figure 9:
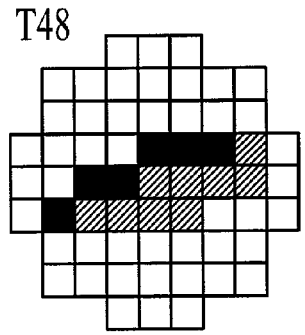
Figure 9:
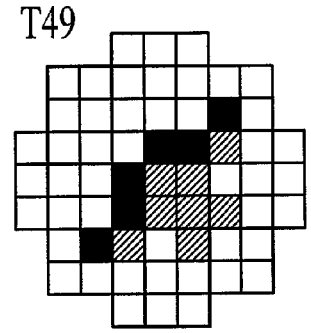
Figure 9:
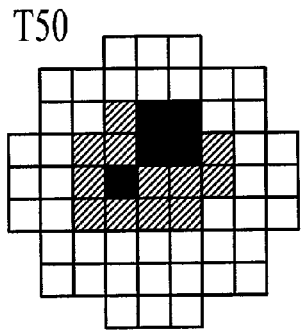
Figure 9:
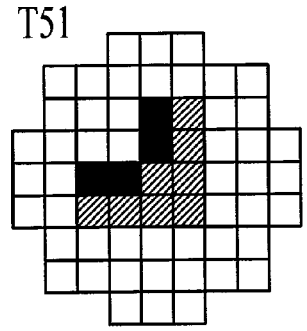
Figure 9:
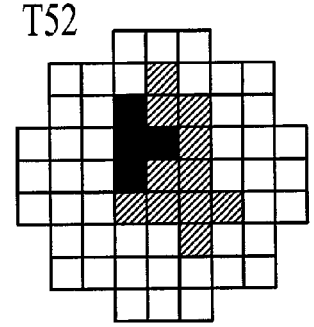
Figure 9:
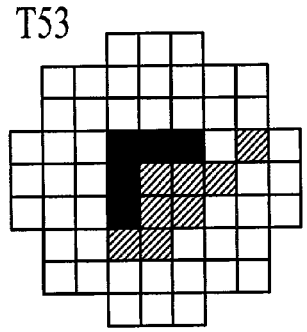
Figure 9:
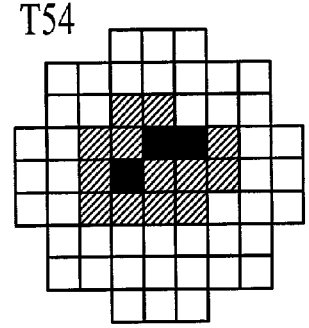
Figure 9:
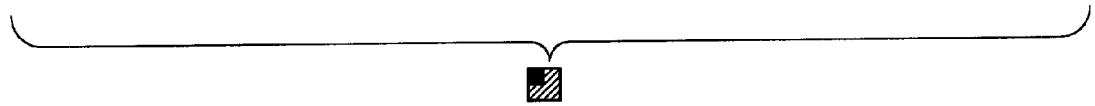
Figure 10:
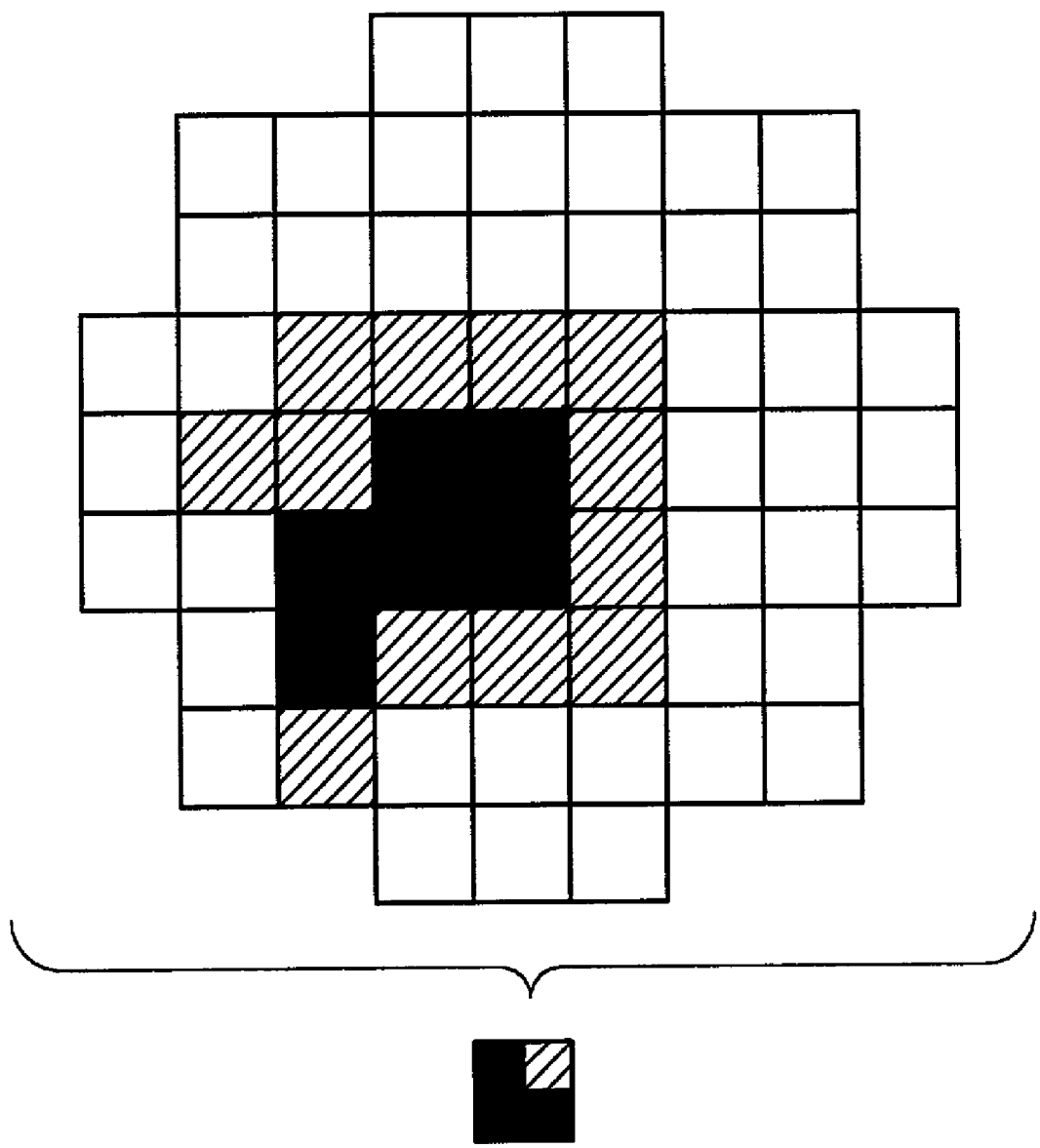
Figure 11:
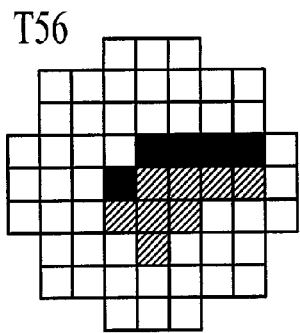
Figure 11:
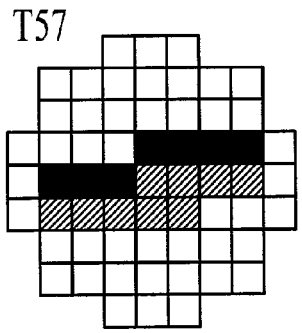
Figure 11:
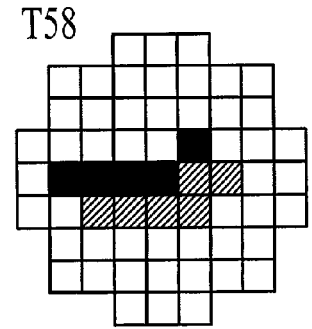
Figure 11:
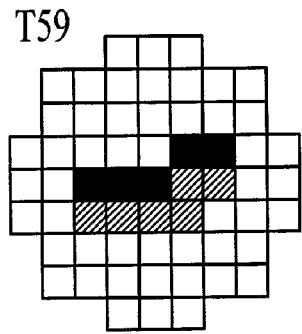
Figure 11:
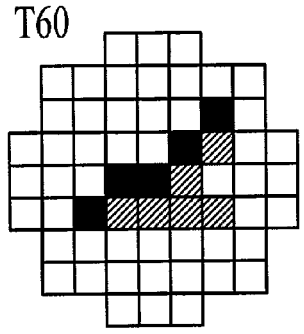
Figure 11:
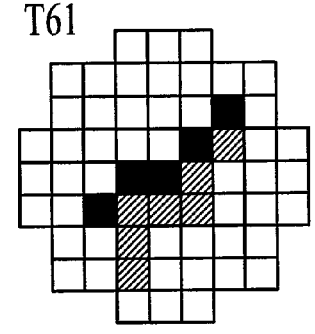
Figure 11:
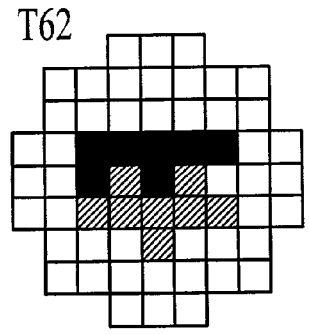
Figure 11:
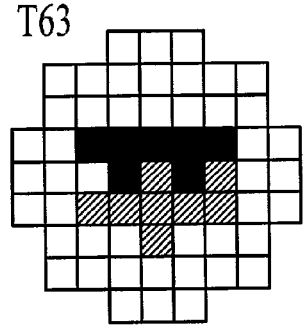
Figure 11:
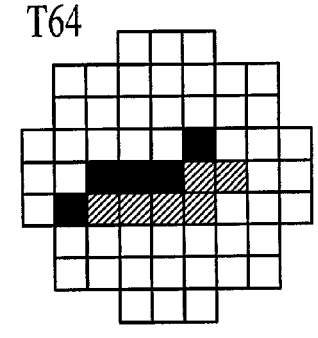
Figure 11:
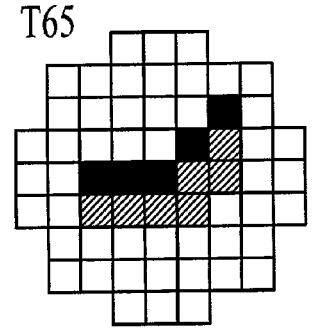
Figure 11:
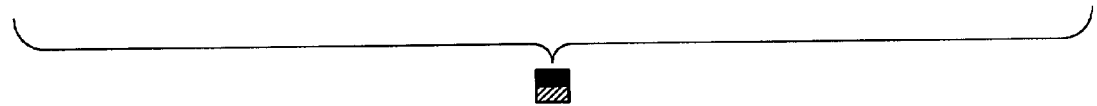
Figure 12:
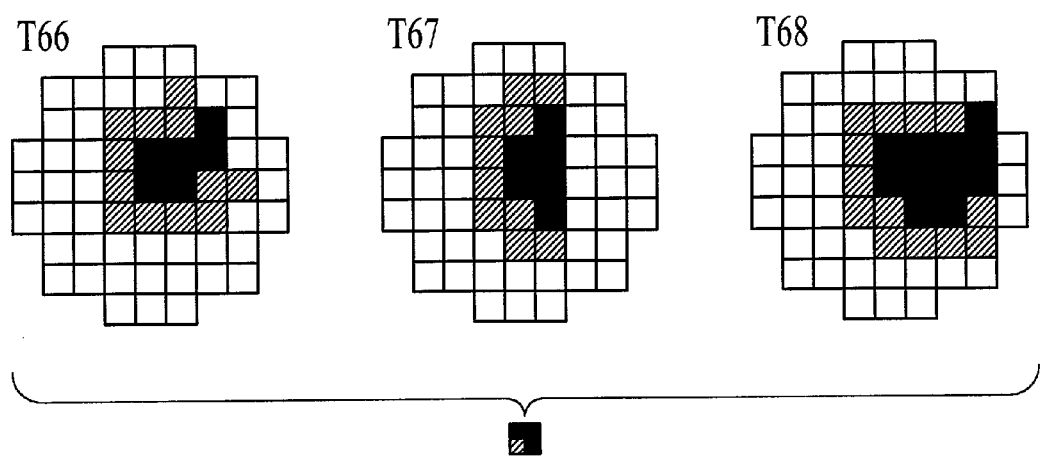
Figure 13:
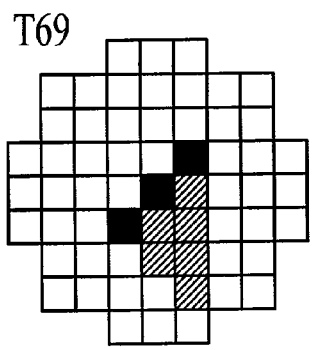
Figure 13:
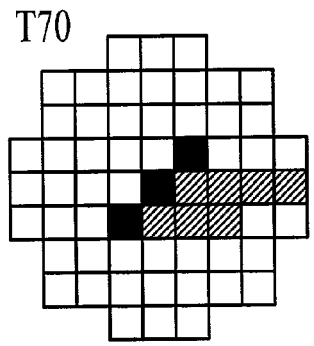
Figure 13:
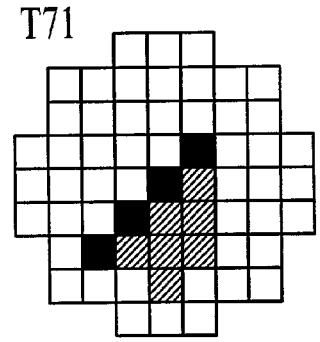
Figure 13:
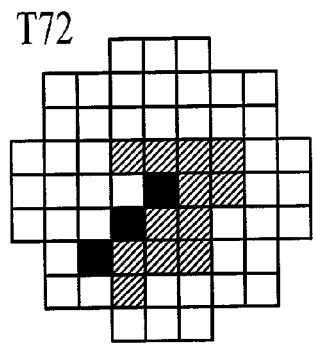
Figure 13:
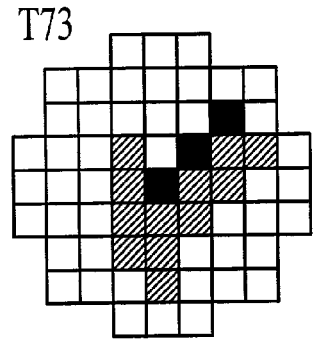
Figure 13:
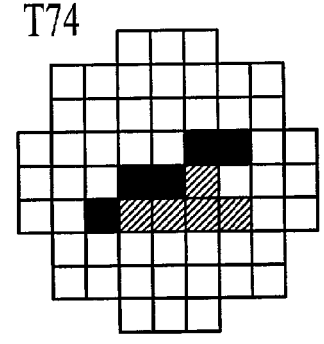
Figure 13:
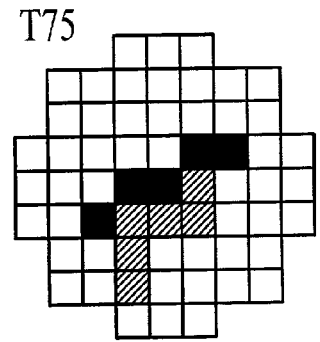
Figure 13:
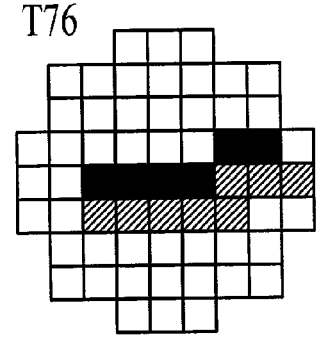
Figure 13:
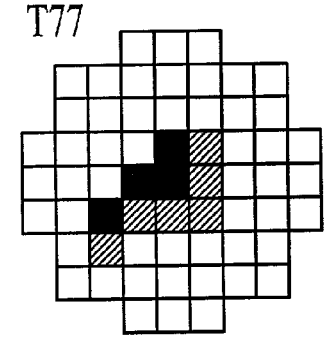
Figure 13:
Figure 14:
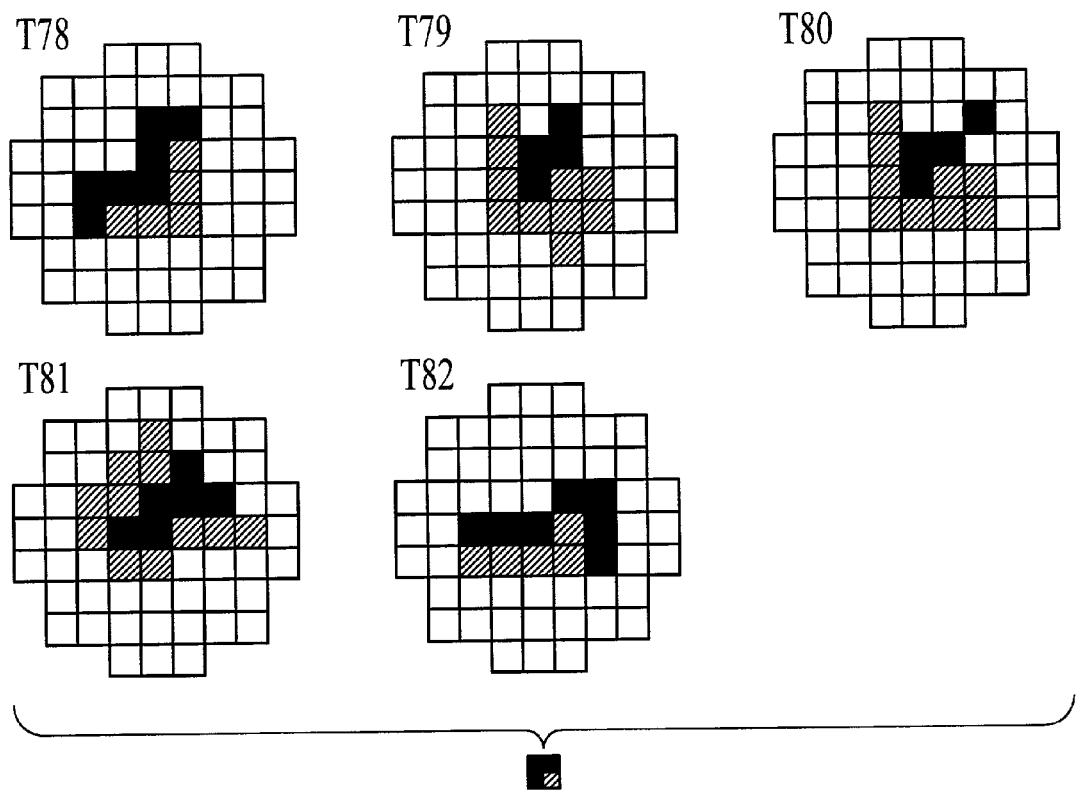

The operation of the text enhancing scaler 106 using the exemplary method is described with reference to FIG. 3. At step 302, an input pixel of the binary image, or a portion of the binary image, is selected to increase the resolution of the image, as well as enhance the text contained in the image. Although the text enhancing scaler may change the resolution of the binary image by any factor, the operation of the text enhancing scaler is described herein as doubling the resolution of the input binary image. At step 304, pixels adjacent to the input pixel are examined to determine whether the input pixel is an interior pixel within the text or the background of the image. The input pixel is determined to be an interior pixel if all of the adjacent pixels are the same, i.e., all white pixels or all black pixels. If the input pixel is an interior pixel, the input pixel is merely replicated into an output super-pixel without any modification, at step 306. In this example, the output super-pixel is a 2×2 pixel region. After step 306, the process then proceeds to step 312.

However, if the input pixel is not an interior pixel, the process proceeds to step 308, where a predefined super-pixel is selected by template matching. During this step, a 9×9 window centered about the input pixel is compared with stored image templates to match the window with a particular image template. Each image template is correlated with a specific output super-pixel to selectively modify the pixels around text edges to smooth the text edges, as well as increase the resolution of the input binary image. The image templates and the output super-pixels may be stored in the text enhancing scaler 106 or in a non-volatile memory (not shown).

The stored image templates T1 through T82 are shown in FIGS. 4–14. The output super-pixels that correspond to the image templates are shown at the bottom of FIGS. 4–14. For each image template, the blank (white) pixels represent "don't care" pixels, the filled (solid) pixels represent black (text) pixels, and the hatched pixels represent white (background) pixels. The image templates T1–T82 provide eighty-two (82) combinations for template matching. However, there are three hundred twenty-eight (328) possible configurations for a particular 9×9 pixel window. In order to consider the other two hundred forty-six (246) possibilities without storing additional image templates, the current 9×9 pixel window may be sequentially rotated ninety degrees (90°). For each rotation, the window is compared using the stored eighty-two (82) image templates. Thus, by taking advantage of window symmetry, all three hundred twenty-eight (328) configurations are considered using only eighty-two (82) image templates. Alternatively, each image template may be rotated in a similar manner to consider the other two hundred forty-six (246) possibilities. In this alternative process, each image template can effectively function as four image templates due to the four possible rotational positions of the image template.

Next, at step 310, the input pixel is scaled and text enhanced using the selected output super-pixel. At step 312, a determination is made whether the current input pixel is the last pixel to be processed. If the current pixel is the last pixel, the process comes to an end. However, if the current pixel is not the last pixel, the process proceeds back to step 302. In this manner, the entire binary image can be scaled to a higher resolution and simultaneously text enhanced.

Turning back to FIG. 1, the color inserter 108 of the color text enhancing system 102 operates to introduce colors of the input color text image into the scaled binary image to convert the scaled binary image to a scaled color text image, i.e., a high-resolution color text image. For each 2×2 super-pixel of the scaled binary image that corresponds to an input pixel of the original image, the color inserter selectively inserts colors from the input pixel or from one of the closest neighboring pixels of the input pixel. Therefore, the color inserter uses information from the original color text image, the binary image and the scaled binary image to convert the scaled binary image to a scaled color text image.

Figure 15:
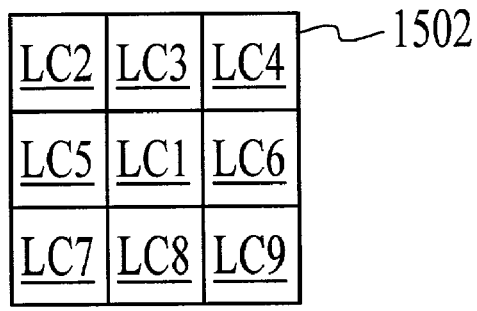
FIG. 15 illustrates the relationship between the colors that are selected for the pixels of a scaled binary image by a color inserter of the color text enhancing system and the colors of the original color text image.
Figure 15:
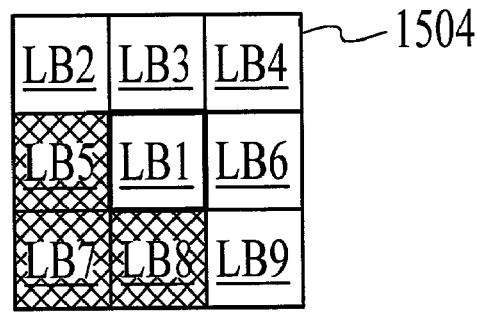
Figure 15:
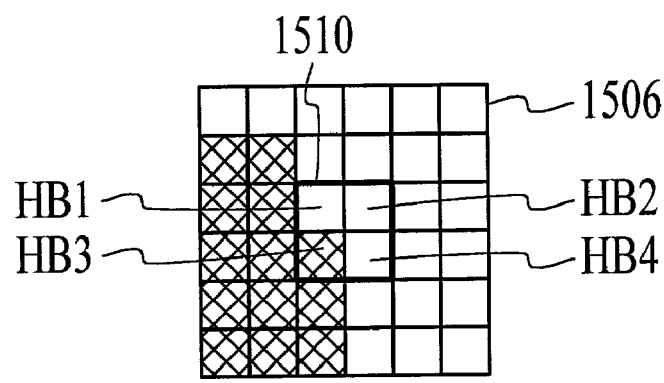
Figure 15:
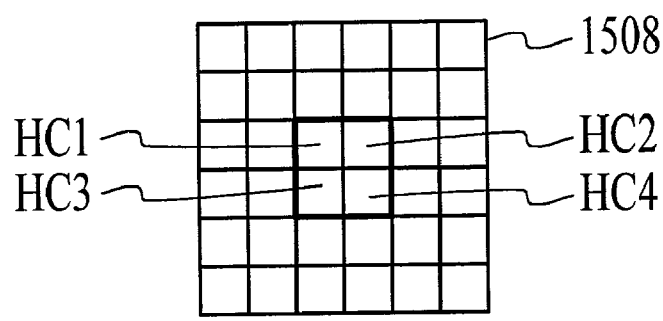
Figure 16:
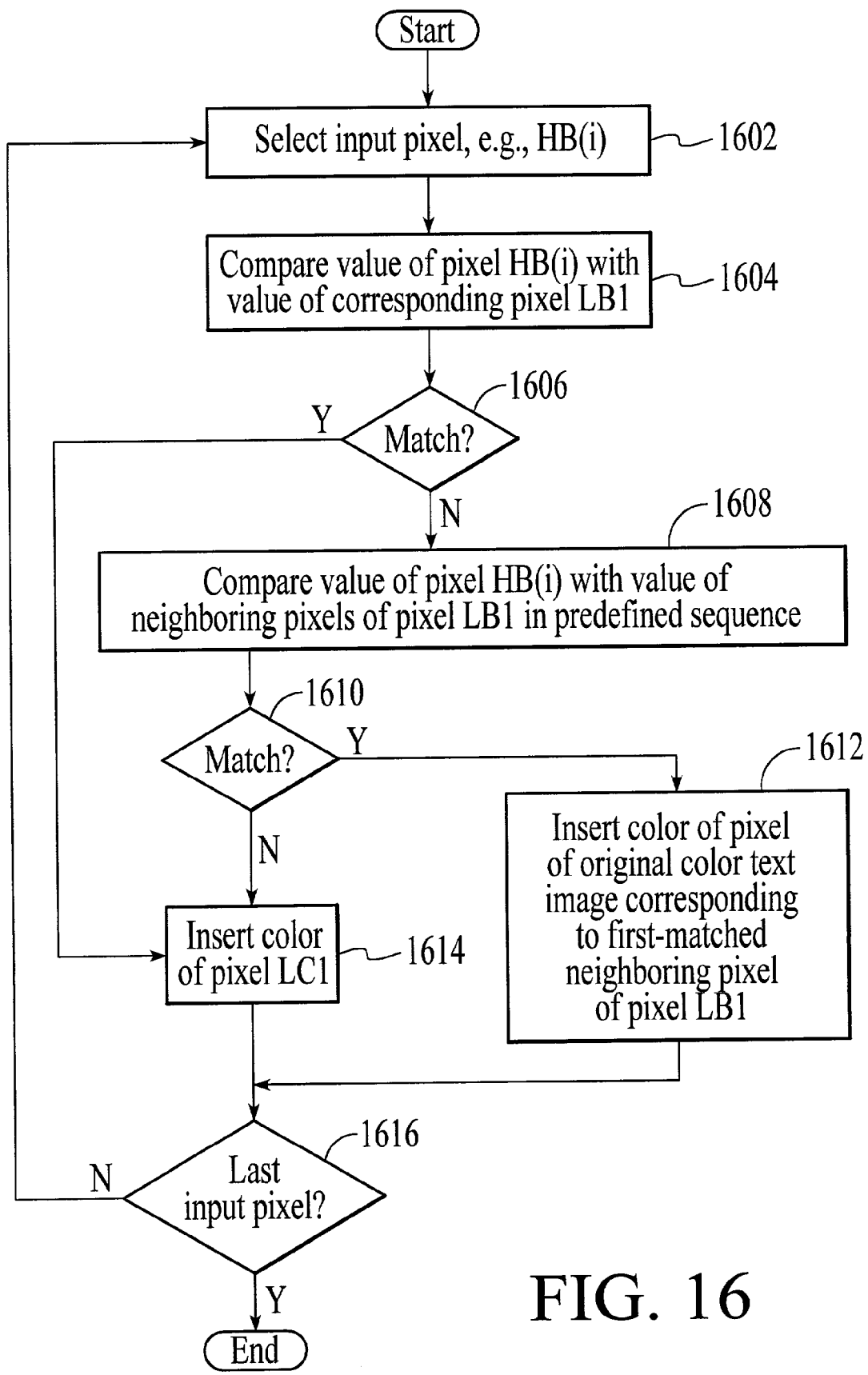
FIG. 16 is a process flow diagram that illustrates the operation of the color inserter.

The manner with which the color inserter 108 assigns colors for each pixel of the scaled binary image is described with reference to FIGS. 15 and 16. FIG. 15 illustrates a low-resolution color image section 1502 that represents the original color text image, a low-resolution binary image section 1504 that represents the low-resolution binary image generated by the color-to-binary converter 104, a high-resolution binary image section 1506 that represents the high-resolution binary image generated by the text enhancing scaler 106, and a high-resolution color image section 1508 that represents the output scaled color text image from the color inserter 108. For the binary images 1504 and 1506, the cross-hatched pixels represent black (text) pixels, while blank pixels represent white (background) pixels. The color inserter 108 operates on the high-resolution binary image 1506 to produce the high-resolution color text image 1508.

In operation, an input pixel of the high-resolution binary image 1506 is selected to be processed by the color inserter 108, at step 1602. The input pixel is part of a 2×2 super pixel that was derived from a pixel of the low-resolution binary image 1504. As an example, the input pixel may be one of the four pixels of the 2×2 super-pixel 1510 of the high-resolution binary image 1506. As shown in FIG. 15, the four pixels of the 2×2 super-pixel 1510 are referenced by HB(i), where HB stands for high-resolution binary and i=1, 2, 3 or 4.

Next, at step 1604, the value of the selected pixel HB(i) is compared to the value of the corresponding pixel in the low-resolution binary image 1504, which is the pixel LB1 for the pixels HB1, HB2, HB3 and HB4 of the super-pixel 1510. The value refers to a numerical representation of a pixel that defines that pixel as a black (text) pixel or a white (background) pixel.

At step 1606, a determination is made whether the value of the selected pixel HB(i) matches the value of the corresponding pixel LB1 of the low-resolution binary image. If there is a match, the process proceeds to step 1614, where the color of a pixel LC1 of the original low-resolution color text image 1502 that corresponds to the pixel LB1 of the low-resolution binary image 1504 from which the input pixel HB(i) was derived is inserted into the input pixel HB(i) to produce an output pixel HC(i) of the high-resolution color text image 1508. However, if there is not a match, the process proceeds to step 1608, where the value of the input pixel HB(i) is compared with the values of selected neighboring pixels of the corresponding pixel LB1 in a predefined sequence. The predefined sequence depends on the input pixel HB(i) of the high-resolution binary image 1506. Below are the predefined sequences for the four HB(i) pixels.

```
For i = 1: LB5, LB3, LB2
For i = 2: LB3, LB6, LB4
For i = 3: LB8, LB5, LB7
For i = 4: LB6, LB8, LB9
```

At step 1610, a determination is made whether the value of the input pixel HB(i) matches any of the values of the selected neighboring pixels LB2, LB3, LB4, LB5, LB6, LB7, LB8 and/or LB9. If there is a match, the process proceeds to step 1612, where the color of a pixel of the low-resolution color text image 1502 that corresponds to the first neighboring pixel that matches the input pixel HB(i) is inserted into the pixel HB(i) to produce an output pixel HC(i) of the high-resolution color text image 1508. If there is not a match, the process proceeds to step 1614, where the default color of the pixel LC1 is inserted into the input pixel HB(i). Next, at step 1616, a determination is made whether the current input pixel is the last pixel of the high-resolution binary image 1506 to be color inserted. If the current input pixel is the last pixel, the process comes to an end. However, if the current input pixel is not the last pixel, then the process proceeds back to step 1602, where the next pixel of the high-resolution binary image 1506 is selected to be processed.

For the super-pixel 1510 of the high-resolution binary image 1506, the pixel HB3 does not have the same value as the corresponding pixel LB1 of the low-resolution binary image 1504, as illustrated in FIG. 15. However, pixels HB1, HB2 and HB4 do have the same value as the pixel LB1. Consequently, the pixels HB1, HB2 and HB4 are assigned the color of the pixel LC1 of the low-resolution color text image 1502, which corresponds to the pixel LB1. Therefore, the pixels HC1, HC2 and HC4 of the high-resolution color text image 1508 are assigned the color of the pixel LC1. For the pixel HB3, the predefined sequence for i=3 is used to determine the pixel color. Since the value of pixel HB3 equals the value of pixel LB8, which is the first pixel in the predefined sequence to match the pixel HB3, the color of pixel LC8 is inserted into the pixel HB3 to produce the pixel HC3 of the high-resolution color text image.

Figure 17:
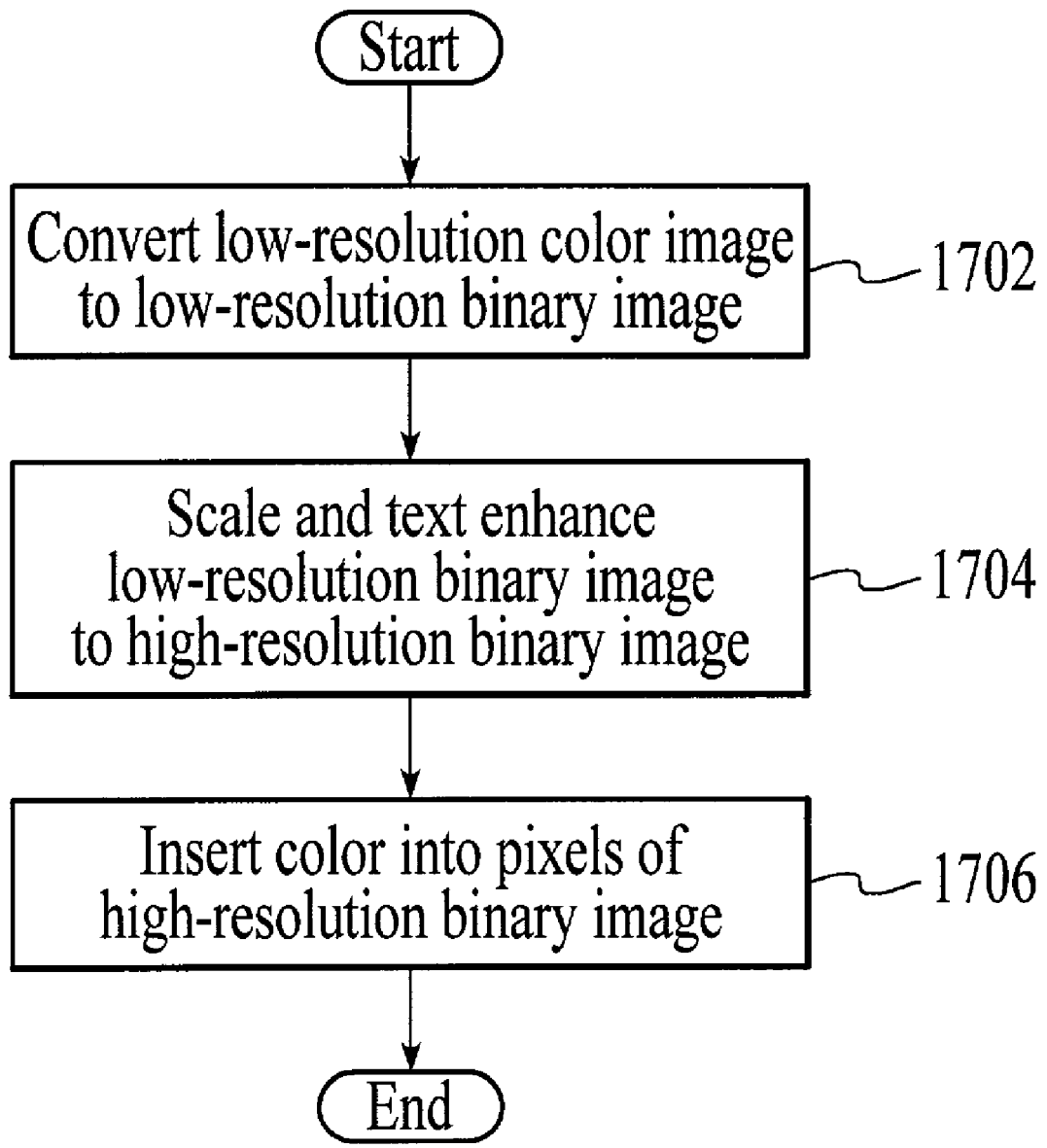
FIG. 17 is a process flow diagram of a method for scaling and text enhancing a color text image in accordance with the invention.

A method of scaling and text enhancing color text images in accordance with the invention is described with reference to FIG. 17. At step 1702, a low-resolution color text image is converted a binary, or black-and-white, image of the same low-resolution. In one embodiment, the binary conversion is performed using a predefined threshold for each color component of the input color text image. As an example, for an input color text image in a CMYK color space format, predefined thresholds $T_c$, $T_m$, $T_y$ and $T_k$ are used for the C, M, Y and K color components. For each pixel of the input color text image, if any of the color components exceeds a corresponding threshold, the pixel is determined to be a text pixel and is converted to a black pixel. Otherwise, the pixel is determined to be a background pixel and is converted to a white pixel. In another embodiment, the binary conversion is performed by classifying the pixels of the input color text image as text pixels or background pixels using criteria of color and group size. In this embodiment, the colors of the text and background pixels of a given color text image are assumed to be different. In addition, the number of text pixels in a given window of pixels is assumed to be smaller than the number of background pixels in the same given window. Therefore, in this embodiment, the input color text image is converted to a binary image by first separating the pixels of the input image into two groups by color. After the pixels of the input color text image have been separated, the pixels that belong to the smaller group are converted to black pixels, while the pixels that belong to the larger group are converted to white pixels.

Next, at step 1704, the low-resolution binary image is scaled to a high-resolution binary image. As an example, the binary image may be scaled from a 300 dpi by 300 dpi image to a 600 dpi by 600 dpi image. In addition to the scaling, the text contained in the high-resolution binary image is enhanced during this step. As an example, the text of the high-resolution binary image may be enhanced by smoothing the edges of the text. The technique used to perform the scaling and text enhancing may be one of many conventional techniques, including the technique described in U.S. Pat. No. 5,650,858 to Lund.

Next, at step 1706, colors are inserted to the high-resolution binary image to generate a high-resolution color text image, which is the final output of the method. In one embodiment, only the colors of the original input color text image are used for the color insertion. As described above in reference to FIGS. 15 and 16, colors for the pixels of the high-resolution binary image are selected by first comparing each pixel of the high-resolution binary image to a corresponding pixel of the low-resolution binary image. If the two pixels match, the color of the pixel of the original low-resolution color text image from which the corresponding pixel of the low-resolution binary image was derived is used. If the two pixels do not match, the color of a pixel of the original document image that corresponds to a neighboring pixel of the corresponding pixel of the low-resolution binary image is used. The neighboring pixel of the low-resolution binary image for color insertion is selected by checking the neighboring pixels of the corresponding pixel of the low-resolution binary image in a predefined sequence. The first neighboring pixel of the low-resolution binary image in the predefined sequence that matches the pixel of the high-resolution binary image is used for color insertion. If the pixel of the high-resolution binary image does not match with any of the neighboring pixels in the predefined sequence, a default color is used, which is the color of the pixel of the original low-resolution color text image from which the corresponding pixel of the low-resolution binary image was derived. In this manner, the input color text image is scaled and text enhanced to produce an output color text image that contains only the colors of the input color text image.

What is claimed is:

1. A method of enhancing an input digital image having color features comprising:
    converting said input digital image to a binary image of first and second type pixels such that pixels of said input digital image that define said color features are substantially converted to said first type pixels of said binary image;
    changing the resolution of said binary image with respect to the number of pixels to derive a modified binary image; and
    selectively inserting colors into pixels of said modified binary image to produce an output digital image having modified color features that differ in resolution from said color features of said input digital image.

2. The method of claim 1 wherein said step of converting said input digital image to said binary image includes comparing color components of said input digital image with predefined thresholds to classify said pixels of said input digital image as either said first type pixels or said second type pixels of said binary image.

3. The method of claim 2 wherein said step of comparing said color components of said input digital image includes classifying said pixels of said input digital image having at least a single color component that exceeds a corresponding predefined threshold as said first type pixels.

4. The method of claim 1 wherein said step of converting said input digital image to said binary image includes dividing said pixels of said input digital image into first and second groups based on color differences of said pixels of said input digital image.

5. The method of claim 4 wherein said step of converting said input digital image to said binary image further includes converting said pixels of said input digital image that belong to a smaller group of said first and second groups to said first type pixels of said binary image and converting said pixels of said input digital image that belong to a larger group of said first and second groups to said second type pixels of said binary image.

6. The method of claim 1 wherein said step of selectively inserting said colors into said pixels of said modified binary image includes inserting only colors from said input digital image into said pixels of said modified binary image.

7. The method of claim 6 wherein said step of selectively inserting said colors into said pixels of said modified binary image includes:
    comparing a particular pixel of said modified binary image with a corresponding pixel of said binary image;
    determining whether said particular pixel of said modified binary image substantially matches said corresponding pixel of said binary image; and
    inserting the color of a pixel of said input digital image from which said corresponding pixel of said binary image was derived into said particular pixel.

8. The method of claim 7 wherein said selectively inserting said colors into said pixels of said modified binary image further includes:
    comparing said particular pixel of said modified binary image with neighboring pixels of said corresponding pixel of said binary image in a predefined sequence, if said particular pixel and said corresponding pixel do not substantially match; and
    inserting the color of a pixel of said input digital image that corresponds to a specific pixel selected from said neighboring pixels of said binary image that substantially matches said particular pixel of said modified binary image into said particular pixel, said specific pixel being a selected pixel of said neighboring pixels in said predefined sequence that substantially matches said particular pixel of said modified binary image.

9. The method of claim 1 wherein said step of changing the resolution of said binary image includes scaling said binary image to a higher resolution binary image and smoothing edges of features of said higher resolution binary image that correspond to said color features of said input digital image, said scaling and smoothing being performed using a template matching technique.

10. A system for enhancing an input digital image having color features comprising:
    means for converting said input digital image to a binary image of first and second type pixels such that pixels of said input digital image that define said color features are substantially converted to said first type pixels of said binary image;
    means for changing the resolution of said binary image with respect to the number of pixels to derive a modified binary image; and
    means for selectively inserting colors into pixels of said modified binary image to produce an output digital image having modified color features that differ in resolution from said color features of said input digital image.

11. The system of claim 10 wherein said converting means is configured to compare color components of said input digital image with predefined thresholds to classify said pixels of said input digital image as either said first type pixels or said second type pixels of said binary image.

12. The system of claim 10 wherein said converting means is configured to divide said pixels of said input digital image into first and second groups based on color differences of said pixels of said input digital image.

13. The system of claim 12 wherein said converting means is further configured to convert said pixels of said input digital image that belong to a smaller group of said first and second group to said first type pixels of said binary image and to convert said pixels of said input digital image that belong to a larger group of said first and second groups to said second type pixels of said binary image.

14. The system of claim 10 wherein said selectively inserting means is configured to execute a plurality of steps comprising:
- comparing a particular pixel of said modified binary image with a corresponding pixel of said binary image;
- determining whether said particular pixel of said modified binary image substantially matches said corresponding pixel of said binary image; and
- inserting the color of a pixel of said input digital image from which said corresponding pixel of said binary image was derived into said particular pixel.

15. The system of claim 14 wherein said selectively inserting means is further configured to execute steps comprising:
- comparing said particular pixel of said modified binary image with neighboring pixels of said corresponding pixel of said binary image in a predefined sequence, if said particular pixel and said corresponding pixel do not substantially match; and
- inserting the color of a pixel of said input digital image that corresponds to a specific pixel selected from said neighboring pixels of said binary image that substantially matches said particular pixel of said modified binary image into said particular pixel, said specific pixel being a selected pixel of said neighboring pixels in said predefined sequence that substantially matches said particular pixel of said modified binary image.

16. A method of enhancing an input digital image having color features comprising:
- converting said input digital image to a binary image of first and second type pixels such that pixels of said input digital image that belong to said color features are substantially converted to said first type pixels of said binary image;
- scaling said binary image to derive a modified binary image, including enhancing binary features of said modified binary image that represent said color features of said input digital image; and
- selectively inserting colors into said pixels of said modified binary image, said colors being derived from original colors of said input digital image.

17. The method of claim 16 wherein said step of converting said input digital image to said binary image includes determining whether any color component of said input digital image exceeds a predefined threshold, said determination being used to classify said pixels of said input digital image as either said first type pixels or said second type pixels of said binary image.

18. The method of claim 16 wherein said step of converting said input digital image to said binary image includes separating said pixels of said input digital image to first and second groups based on spatial locations of said pixels of said input digital image on a color space.

19. The method of claim 18 wherein said step of converting said input digital image to said binary image further includes converting said pixels of said input digital image that belong to a smaller group of said first and second groups to said first type pixels of said binary image and converting said pixels of said input digital image that belong to a larger group of said first and second groups to said second type pixels of said binary image.

20. The method of claim 16 wherein said step of selectively inserting said colors into said pixels of said modified binary image includes:
- comparing a particular pixel of said modified binary image with a corresponding pixel of said binary image;
- determining whether said particular pixel of said modified binary image matches said corresponding pixel of said binary image with respect to pixel values; and
- inserting the color of a pixel of said input digital image from which said corresponding pixel of said binary image was derived into said particular pixel.

21. The method of claim 20 wherein said selectively inserting said colors into said pixels of said modified binary image further includes:
- comparing said particular pixel of said modified binary image with neighboring pixels of said corresponding pixel of said binary image in a predefined sequence, if said particular pixel and said corresponding pixel do not match; and
- inserting the color of a pixel of said input digital image that corresponds to a specific pixel selected from said neighboring pixels of said binary image that matches said particular pixel of said modified binary image into said particular pixel, said specific pixel being a selected pixel of said neighboring pixels in said predefined sequence that matches said particular pixel of said modified binary image.

* * * * *